United States Patent [19]

Hawkins et al.

[11] Patent Number: 4,480,149
[45] Date of Patent: Oct. 30, 1984

[54] LIGHTWEIGHT FRAME-TYPE ELASTOMER DAMPING SPACER

[75] Inventors: Ronald G. Hawkins; John E. Muniak, both of Massena, N.Y.

[73] Assignee: Aluminum Company of America, Pittsburgh, Pa.

[21] Appl. No.: 447,248

[22] Filed: Dec. 6, 1982

[51] Int. Cl.³ .............................................. H02G 7/12
[52] U.S. Cl. ...................................... 174/42; 174/146
[58] Field of Search ...................... 174/40 R, 42, 146

[56] References Cited

U.S. PATENT DOCUMENTS

| | | | |
|---|---|---|---|
| 3,609,209 | 9/1971 | Houston et al. | 174/42 |
| 3,748,370 | 7/1973 | Dalia | 174/42 |
| 3,784,723 | 1/1974 | Cantamessa | 174/42 |
| 3,885,086 | 5/1975 | Houston et al. | 174/42 |
| 4,178,467 | 12/1979 | Hawkins | 174/146 X |
| 4,188,502 | 2/1980 | Gagné | 174/42 |

*Primary Examiner*—Laramie E. Askin
*Attorney, Agent, or Firm*—Brian D. Smith

[57] ABSTRACT

A damping spacer having substantially all metallic components thereof made from wrought materials is disclosed. The spacer has a stamped wrought metal frame and a plurality of extruded metal conductor clamp arms which are secured to the frame in a manner that dampens conductor vibrations. Each clamp arm extends outwardly from the frame and is secured to the frame by an extruded metal pivot pin which is affixed to the frame. Each pivot pin has a noncircular cross-sectional shank which extends through a noncircular opening provided in each clamp arm. An elastomer damping collar is inserted on each pivot pin shank so as to also extend through the respective clamp arm opening. The internal and external surfaces of each collar are sized and configured to intimately mate with the noncircular cross-sectional shank of the respective pivot pin and noncircular opening of the respective clamp arm. As such, rotational movement between the pins and the arms caused by conductor vibration is effectively dampened. Extruded metal stop pins also affixed to the frame engage the clamp arms in a manner that prevents the arms from excessive rotational movement about their respective pivot pins. Clamps are also provided for securing each clamp arm to its respective conductor.

6 Claims, 5 Drawing Figures ns made from wrought materials, such as extruded aluminum, aluminum sheet and spring steel. The spacer has a stamped wrought metal frame, which is comprised of two opposing plates. Located between the two opposing plates and extending outwardly therefrom are two or more conductor clamp arms (the number depending on the number of conductors) which are preferably made from extruded aluminum. Located on each outwardly facing end of the clamp arm is a means for clamping the conductor to the respective clamp arm. Connecting each clamp arm to the frame is a means which includes an extruded pivot pin having a shank extending through a noncircular opening provided in the clamp arm. The pivot pin is rigidly fixed to the frame plates, preferably, by riveting each end thereof to its respective plate. As its name implies, the pivot pin permits rotation of the clamp arm about the pin. However, the rotation permitted is not unrestricted. To restrain or dampen rotation, an elastomer damping collar is located on the pivot pin. The collar extends through the clamp arm opening and has its noncircular external surface sized and configured to mate with the associated noncircular clamp arm opening to restrain relative rotational movement between the collar and the arm. Additionally, the internal opening surface of the collar located on the pivot pin is sized and configured to mate with the noncircular cross-sectional shape of the pivot pin shank to restrain relative rotational movement between the pivot pin and collar. With relative rotation of these components restrained, the elastomer collar undergoes torsional shear to restrain and thus dampen movement of the clamp arm about the pivot pin.

In a preferred embodiment, each elastomer collar is provided with two integral elastomer flanges, each extending outwardly and radially from each end of the collar's shank along the proximate side surfaces of the associated clamp arm and against the proximate plate surface of the frame. The flanges serve to center the clamp arm between the opposing plate surfaces of the frame. More importantly, they reduce the severity of articulation occurring in the shank of the collar, thereby increasing the life of the collar since stress fatigue associated with such motion is minimized. Additionally, the flanges serve to protect the clamp arms from frictional forces caused by metal-on-metal contact.

In addition to a pivot pin, each clamp arm is engaged by an extruded motion limiting or stop pin positioned between the opposing frame plates which prevents the clamp arm from excessive rotational movement about the pivot pin, thereby protecting the elastomer collars from fracturing or damaging forces. At least one end of the stop pin is rigidly fastened to the frame, preferably, by riveting or some other suitable means.

Riveting is the preferred fastening means for both the pivot and stop pins because of a rivet's ability to withstand vibration and amenability to multiple die tooling which permits the rivets to be headed-in in a single operation. It should also be pointed out that cast pins cannot be riveted due to their tendency to fracture during the riveting process. Riveting is also much more reliable than other fastening means, such as bolting which is particularly undesirable due to the added cost and weight associated with bolts, lock washers, etc.

Accordingly, the present invention provides a lightweight, inexpensive damping spacer capable of being made entirely from lightweight wrought and elastomer materials. Further contributing to low cost and light

LIGHTWEIGHT FRAME-TYPE ELASTOMER DAMPING SPACER

BACKGROUND OF THE INVENTION

The present invention relates generally to devices for spacing and damping conductors of overhead electric lines, and particularly to an extremely lightweight, low-cost, damping spacer in which substantially all metallic components thereof are made from wrought materials.

In a previous patent, U.S. Pat. No. 4,178,467 (issued to R. G. Hawkins, one of the present applicants), there is disclosed a lightweight rigid spacer device wherein spacing is provided by use of a thin-wall, hollow channel member, the channel typically being an extruded product. A lightweight, resilient strap means is also used to connect the spacer bar to the conductor. While the spacer works very well for its intended purpose, it does not provide damping against wind-induced vibration occurring in the conductors. Devices providing such protection, in addition to spacing, are typically referred to in the trade as spacer dampers or damping spacers.

Heretofore, damping spacers typically have been rather large and heavy, generally as a result of using rather heavy cast parts. For example, U.S. Pat. No. 3,885,086, to Houston et al, discloses a damping spacer assembly having a cast housing and cast conductor clamp arms. Also, U.S. Pat. No. 3,609,209, to Houston et al, discloses a damping spacer having cast conductor clamp arms. Similarly, U.S. Pat. No. 4,188,502, to Gagne, discloses a damping spacer having a metallic frame made of cast aluminum. In addition, while U.S. Pat. No. 3,748,370, to Dalia, does not mention how the components of the damping spacer described therein are formed, it appears from the drawings that the clamp arms and frame could not be feasibly made by any process other than casting.

Cast products inherently suffer from certain inadequacies not present in wrought products, particularly wrought extruded products. For instance, cast products lack the strength of wrought products. To compensate for this, cast products use more metal than wrought products, thereby adding weight and expense to the final cast product. Furthermore, even with more metal, cast products are invariably less reliable than wrought products. Excessive porosity, blow holes and dimensional inaccuracy act and interact, particularly in the case of sand castings, to lessen reliability. In addition, the surface of a cast product is invariably much rougher than a wrought product's unless, of course, the cast product is machined. However, machining, which adds time and expense, is not desirable. Machining is also undesirable in that the stresses added to those areas machined have the overall effect of weakening the part produced.

Accordingly, it would be desirable if a damping spacer could be produced having wrought metal components. Since less metal would be required, savings in cost would result. Even more importantly, structural integrity and operational reliability would be dramatically improved.

BRIEF SUMMARY OF THE INVENTION

In accordance with the above objectives, the present invention provides an inexpensive, extremely lightweight damping spacer for conductor bundles, the damping spacer being comprised of metallic compoweight are the few parts comprising the spacer. In addition, it will be recognized that the smooth surfaces of the pivot pin and the opening in the clamp arm, which are obtainable as a result of extruding both components, serve to protect the elastomer pads against fretting. Since such smooth surfaces are not obtainable by casting, dampers employing cast pins and elastomer collars will typically have a much shorter service life as a result of elastomer pad failure.

Also significantly contributing to a longer service life is the spacer damper's extreme light weight. Less weight means less stress on the damper's components, particularly the elastomer collars, both during the damping mode and at rest; consequently, the possibility of early component fatigue is greatly reduced.

THE DRAWINGS

Many additional advantages flow from the above structure, which advantages will be specifically referred to and discussed below in the process of describing the structure in detail and in reference to the accompanying drawings in which.

DETAILED DESCRIPTION OF THE PREFERRED EMBODIMENT

Figure 1:
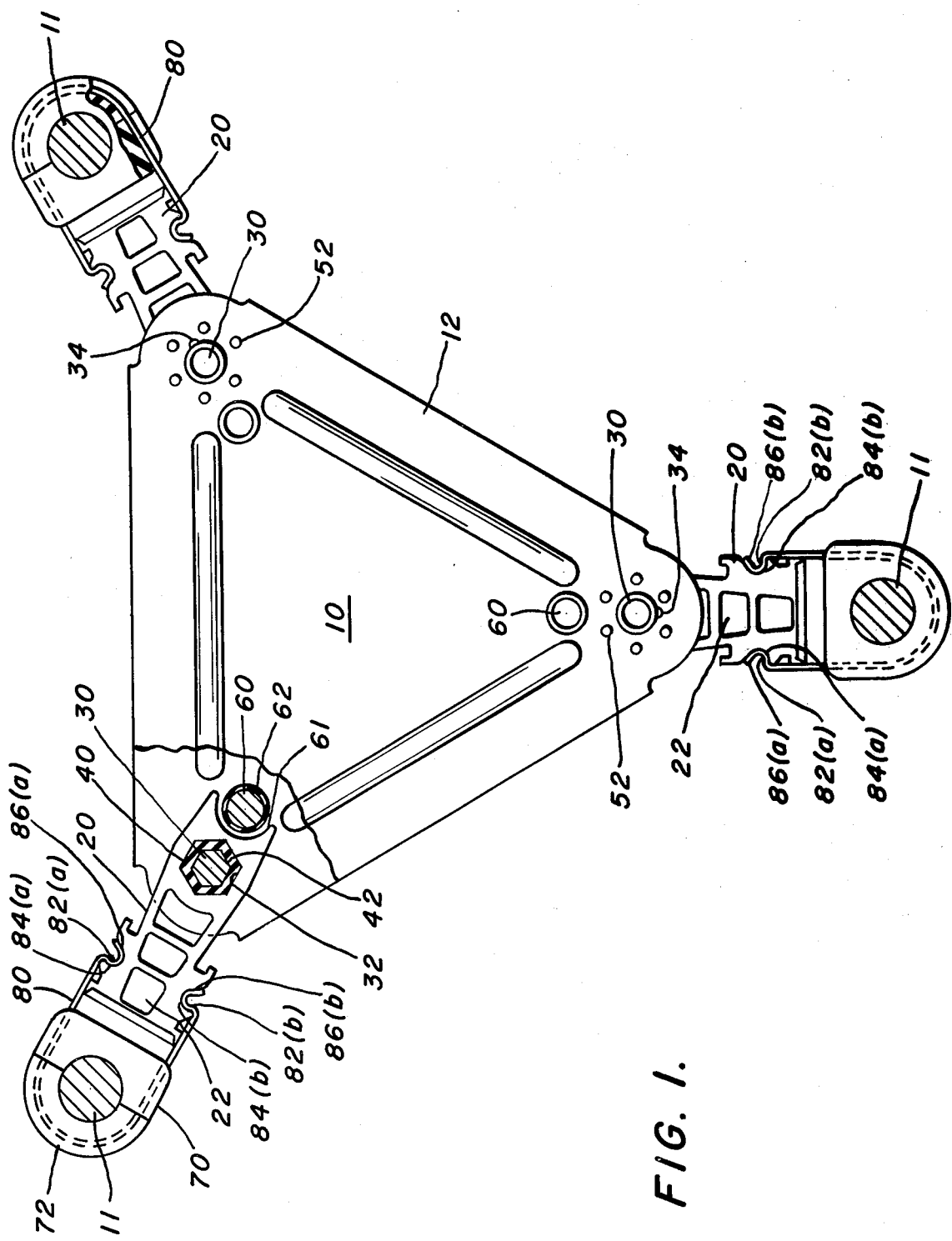
FIG. 1 is a plan view of the device of the invention.

Referring now to the drawings, FIG. 1 depicts a device, damping spacer 10, for spacing three overhead conductors 11 and damping each against conductor vibration. Spacer 10 includes a two-piece triangular frame 12 having two parallel and opposed plates, 14(a) and 14(b). The plates are made of an inexpensive, lightweight metal stamping, preferably aluminum or an alloy thereof.

Housed between the plates are three conductor clamp arms 20 (see FIG. 2 or 3), each of which extends radially outwardly from the corner of the triangle of the frame (and on axes that extend through the center of spacer 10) in addition to being spaced equally apart from each other (see FIG. 1). As mentioned previously, clamp arms 20 are preferably made from extruded aluminum; however, any extruded material possessing sufficient strength as well as being lightweight will perform satisfactorily. To further reduce the weight of spacer 10, holes 22 may be provided in clamp arms 20. Holes 22 may be of any dimension and configuration so long as the clamp arms retain sufficient strength.

While frame 12 is depicted as having two plates (i.e., 14(a) and (b)), frame 12 could also be one piece by integrally connecting the plates along one end side. For example, since the frame of a three conductor spacer typically has three end sides, one between each conductor, a one-piece frame could easily be constructed from a metal stamping by folding a properly dimensioned precut stamping in half. In this way, one end side would integrally connect the plates. When installed, the integral side would preferably face upwardly (i.e., towards the sky) to shield elastomer members housed between the plates from damaging ultraviolet sunlight, air pollutants, etc.

Returning to the embodiment depicted in the drawings, each clamp arm 20 is secured or anchored between plates 14(a) and (b) by an extruded pivot pin 30 (made from extruded material, preferably aluminum or an alloy thereof) which extends through an opening 32 provided in the clamp arm. As such, pivot pin 30 provides an axis about which clamp arm 20 can rotate. In addition, each end of the pivot pins is rigidly fixed to its respective plate (i.e., plates 14(a) and (b)). In the embodiment described, pin 30 is rigidly fixed by riveting each end of the pin to its respective plate through key-shaped holes provided in each plate. During riveting, metal from the pivot pin flows into the key part of the key-shaped holes to form pivot pin knob 34. Knob 34 prevents pivot pin 30 from rotating in the aperture provided in the frame plate, thereby completing the riveting process to rigidly fix each pivot pin to plates 14(a) and (b). While riveting is the preferred fastening means, any means of rigid fastening which is apparent to those skilled in the art is contemplated to be within the spirit of the present invention. Bolting, however, as previously mentioned, is not recommended.

Figure 2:
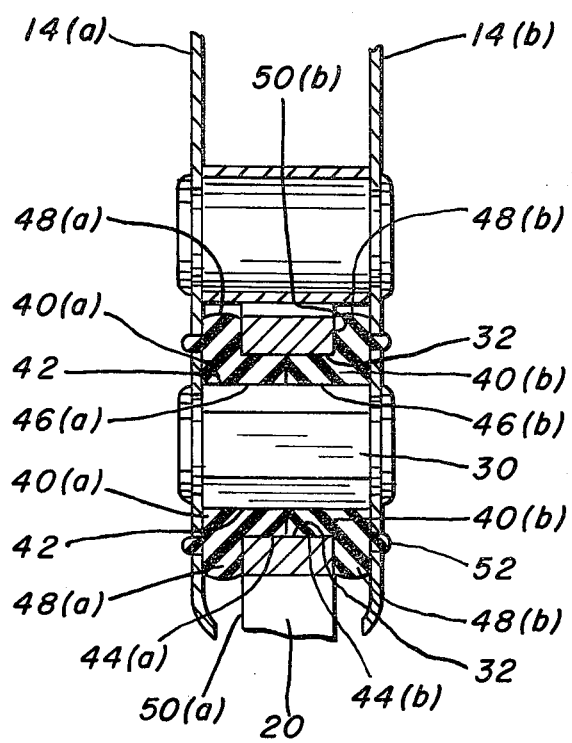
FIG. 2 is a partial sectional view of the embodiment shown in FIG. 1, with the pins shown in elevation and two elastomer collar halves shown in section.
Figure 3:
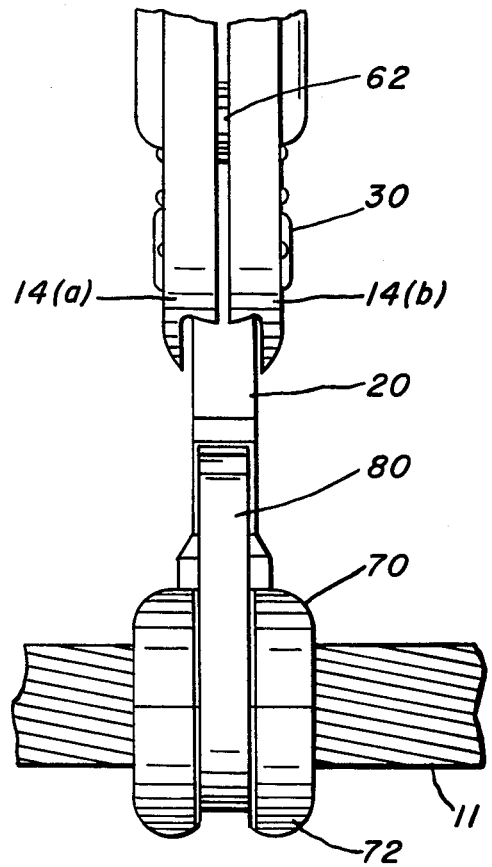
FIG. 3 is a partial end elevation view of the embodiment of FIG. 1 showing a clamp arm and assembly secured to a conductor.
Figure 4:
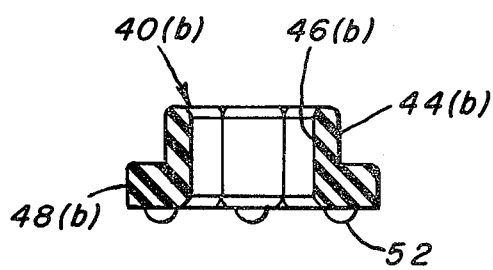
FIG. 4 is a sectional view of one elastomer collar half shown in FIG. 2.

While pivot pin 30 extends through opening 32 provided in the clamp arm to provide an axis about which the clamp arm 20 can rotate, it should be pointed out that clamp arm 20 and pivot pin 30 are not in intimate contact. Instead, an elastomer damping collar 40, depicted in FIG. 2 as damping collar halves 40(a) and (b), is inserted or provided between the surface of clamp arm opening 32 and the shank surface 42 of pivot pin 30. As illustrated in FIG. 2, external collar shank surfaces 44(a) and (b) are sized and configured (hex-shaped) to mate respectively with the surface of clamp arm opening 32, and internal collar shank surfaces 46(a) and (b) are sized and configured (hex-shaped) to mate respectively with pivot pin shank surface 42. These hex-shaped mating surfaces serve to restrain relative rotational movement between the pin and the collar and between the collar and the clamp arm. It should also be pointed out that to prevent the collars from wearing out due to friction generated between the pad and metal surfaces, each pad is preferably lubricated prior to assembly or installation in the spacer damper. Suitable lubricants include Teflon (a registered trademark of DuPont), molysulfite, graphite, etc.

In operation (i.e., upon being subjected to wind-induced vibration) the collar shanks undergo torsional shear (dissipating most of the vibratory energy as heat) to dampen the movement of the clamp arm about the pivot pin. Torsional shear occurs in the damping collar as a result of restraining relative rotational motion between the pin and collar and the clamp arm and collar which, as previously mentioned, results from providing the respective clamp arm openings, elastomer collar shanks and pivot pin shanks with respective mating hex-shaped cross sections. While provided with a hex shape in the embodiment described, those skilled in the art will recognize that other noncircular shapes can be used to generate torsional shear in the elastomer collar to provide damping.

Another important aspect of the present invention is the provision of an integral flange 48 on each damping collar half. (If the damping collar is one piece, flanges would be located on each end of the collar, integral with the collar shank.) As can be seen in FIG. 2, flanges 48(a) and (b) of collar halves 40(a) and (b), respectively, extend outwardly and radially with respect to the collars' axes from the ends of the respective collar's shank, each flange extending along the proximate side surface of clamp arm 20 (i.e., either 50(a) or (b)) and against the proximate plate surface (i.e., either 14(a) or 14(b)) of frame 12. Accordingly, it can be seen that the flanges serve to center the clamp arm between plates 14(a) and (b). More importantly, however, flanges 48(a) and (b) enhance collar shank resistance to damping fatigue by reducing the extent to which articulation can occur in the collar shank. In addition, with less articulation present in the collar shank, less elastomer material is required in the shank, thereby further reducing the weight of the spacer. Moreover, since the flanges provide a cushion between the sides of the clamp arm and the surfaces of the respective plates, both the clamp arms and plates are protected from damage caused by metal-on-metal contact. It should additionally be noted that in the embodiment described each of flanges 48(a) and (b) is provided with a number of projections 52 which extend, respectively, through holes provided in the plates. Projections 52 restrict collar halves 40(a) and (b) from moving relative to plates 14(a) and (b).

Figure 5:
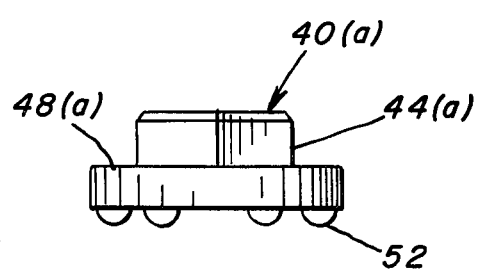
FIG. 5 is a side elevation view of the other collar half shown in FIG. 2.

Flanges 40 may be formed during installation of the collar in the damper as a result of column loading the collar, or they may be preformed before installation, for example, by injection molding the collar. (See FIG. 5 for a separate illustration of a preformed molded collar half with integral flange 48.)

Returning now to FIG. 1, it can be seen that each clamp arm 20 is engaged on its inwardly facing end by another pin, referred to herein as stop pin 60. As with the pivot pin, stop pin 60 is positioned between the frame plates. Stop pin 60 engages the inward end of clamp arm 20 in a manner that permits some movement of clamp arm 20 but prevents excessive movement, i.e., movement that might cause damage to elastomer damping collar 40. In the embodiment shown, movement is controlled by providing the clamp arm end with a concaved recessed region 61 that partially surrounds a similarly shaped shank of stop pin 60. Also contributing to movement control is an elastomer sleeve 62 provided on the shank of the stop pin 60. Sleeve 62 also protects stop pin 60 from metal-on-metal contact with the end of the clamp arm 20. As with pivot pin 30, the ends of stop pin 60 are also preferably riveted to frame 12.

Continuing with FIG. 1, there are disclosed three conductor clamp assemblies, each connecting an overhead conductor to its respective clamp arm. The clamping assemblies are similar (except for certain exceptions explained herein) in construction and operation to the clamping mechanism disclosed in previously mentioned U.S. Pat. No. 4,178,467 which is hereby incorporated by reference. Each clamp assembly is comprised of inside elastomer bushing 70, outside elastomer bushing 72 and resilient clip 80, preferably made from wrought rolled spring steel. Inside bushing 70 is adapted to mount on the end of clamp arm 20 which faces outwardly. Similar to that described in U.S. Pat. No. 4,178,467, bushing 70 has an outwardly facing semicircular recess for receiving a conductor. Outside bushing 72 has a similarly shaped semicircular recess which faces inwardly for purposes of receiving the side of the conductor not engaged by bushing 70.

Bushing halves 70 and 72 are compressed and clamped together about the conductor by U-shaped resilient clip 80 which has planar leg portions of equal length extending from the base of the U. In contrast to the embodiment depicted in U.S. Pat. No. 4,178,467, the ends of the legs are provided with small U-shaped snaps, 82(a) and (b), the base of the U of 82(a), facing that of 82(b). Snaps 82(a) and (b) provide a means for fastening the clamp assembly to clamp arm 20 by snapping respectively into grooves 84(a) and (b) provided in clamp arm 20. Snapping requires that grooves 84(a) and (b) be provided with shapes closely complementing that of snaps 82.

As previously mentioned, when engaging a conductor, bushing halves 70 and 72 will be under compression. Such compression exerts pressure outwardly through snaps 82(a) and (b) onto grooves 84(a) and (b) to prevent snaps 82 from slipping out of grooves 84. In addition, the two-sided nature of the snaps neutralizes certain forces which occur during articulation to prevent angular rotation of the clip about the clamp arm (i.e. the forces bearing upon inwardly facing side 86 are neutralized by those bearing upon the outwardly facing side of the snap). Preferred results are obtainable when inwardly facing sides 86(a) and (b) of snaps 82(a) and (b), respectively, project inwardly towards the center of the damper assembly at an angle between 25° and 35°. The angle is measured from a line perpendicular to the line extending radially from the center of the damper assembly through the center of the respective clamp arm's stop and pivot pins.

Installation of overhead conductors to damping spacer 10 is similar to the procedure described in U.S. Pat. No. 4,178,467; reference thereto is, therefore, suggested.

While the invention has been described in terms of preferred embodiments, the claims appended hereto are intended to encompass all embodiments which fall within the spirit of the invention.

What is claimed is:

1. An inexpensive, lightweight damping spacer having substantially all metallic components thereof made from wrought materials, said spacer comprising:
   a frame having two opposing plates, said frame being an inexpensive wrought metal stamping,
   conductor clamp arms located between the plates and extending outwardly therefrom, each clamp arm provided with at least one noncircular opening extending therethrough, said clamp arms being inexpensively made from extruded metal,
   means attached to the frame for securing the clamp arms between the opposing plates, said means including extruded metal pivot pins having shanks provided with noncircular cross-sectional shapes, each shank extending through the noncircular opening provided in the respective clamp arm to secure said arms in a manner that permits rotational movement of the arms about the respective pins, the ends of said pivot pins being rigidly fixed to the respective plates,
   stop pins positioned between the opposing plates and rigidly fixed to at least one plate, each stop pin engaging the respective clamp arm in a manner that prevents the arm from excessive rotational movement about the respective pivot pin, said stop pins also being made from extruded metal,
   elastomer damping collars respectively located on the pivot pins and extending through the respective openings provided in the arms, each collar having an internal opening surface sized and configured to mate with the noncircular cross-sectional shape of the respective pivot pin shank for the purpose of restraining relative rotational movement between the pin and the collar, each collar additionally having an external surface sized and configured to mate with the associated noncircular clamp arm opening to restrain relative rotational movement between the collar and the arm, and means located respectively on the outwardly facing end of each clamp arm for clamping each clamp arm to its respective conductor.

2. The damping spacer of claim 1 in which each elastomer collar is provided with two integral elastomer flanges, each flange extending outwardly and radially with respect to the collar's axis from its respective end of the collar's shank along the proximate surface of the associated clamp arm and against the proximate plate surface of the frame, as such, being located between the clamp arm and respective frame plate.

3. The damping spacer of claim 1 in which each clamp arm is provided with an end portion that at least partially surrounds the stop pin associated with the clamp arm.

4. A damping spacer as recited in claim 1 wherein said conductor clamping means comprises conductor clamp assemblies, each assembly including an inside elastomer bushing adapted to mount on the end of the respective clamp arm and having an outwardly facing semicircular recess for receiving a conductor, an outside elastomer bushing having an inwardly facing semicircular recess for receiving that side of the conductor not engaged by said inside bushing, and a U-shaped resilient clip for compressing and clamping said bushings together about the conductor, said clip having planar legs extending from the base of the U, said legs being provided with means for fastening the legs to the clamp arm to prevent slippage therebetween and angular rotation of said clip about the clamp arm when said assembly is engaging a conductor.

5. A damping spacer as recited in claim 4 wherein the fastening means includes the provision of an integral U-shaped snap on the end of each clip leg which snaps into a complementary-shaped groove provided on the respective side of the clamp arm so that when engaging a conductor said snaps and grooves of the respective clip and clamp arm cooperate to prevent slippage therebetween and angular rotation of said clip about said clamp arm, said angular rotation being prevented primarily by the two-sided nature of each snap which neutralizes the forces bearing upon the inwardly facing side of the snap with those bearing upon the outwardly facing side of the snap.

6. A damping spacer as recited in claim 5 wherein the inwardly facing side of the snap projects inwardly towards the center of the damper assembly at an angle between 25° and 35°, said angle being measured from a line perpendicular to the line which extends radially from the damper assembly center through the center of the respective clamp arm.

* * * * *